United States Patent
Schrittenlacher

(10) Patent No.: US 7,831,399 B2
(45) Date of Patent: Nov. 9, 2010

(54) METHOD FOR DETERMINING THE GAS VOLUME FLOW IN GAS RECIRCULATION AT A FILLING STATION

(75) Inventor: Wolfgang Schrittenlacher, Hamburg (DE)

(73) Assignee: Fafnir GmbH, Hamburg (DE)

( * ) Notice: Subject to any disclaimer, the term of this patent is extended or adjusted under 35 U.S.C. 154(b) by 12 days.

(21) Appl. No.: 12/029,981

(22) Filed: Feb. 12, 2008

(65) Prior Publication Data

US 2008/0195331 A1 Aug. 14, 2008

(30) Foreign Application Priority Data

Feb. 12, 2007 (DE) .................. 10 2007 006 836

(51) Int. Cl.
*G01F 17/00* (2006.01)

(52) U.S. Cl. ........................................ 702/55

(58) Field of Classification Search .................. 702/55
See application file for complete search history.

(56) References Cited

U.S. PATENT DOCUMENTS

| | | | |
|---|---|---|---|
| 6,170,539 B1 * | 1/2001 | Pope et al. ............... | 141/59 |
| 6,536,273 B2 | 3/2003 | Schrittenlacher | |
| 6,629,455 B2 | 10/2003 | Schrittenlacher et al. | |
| 7,275,417 B2 * | 10/2007 | Hart ......................... | 73/40 |
| 7,353,703 B2 * | 4/2008 | Kunter ..................... | 73/149 |
| 2005/0045243 A1 | 3/2005 | Willmer et al. | |
| 2008/0099097 A1 | 5/2008 | Maurer et al. | |

FOREIGN PATENT DOCUMENTS

| | | |
|---|---|---|
| DE | 19913968 A1 | 10/2000 |
| DE | 10031813 A1 | 1/2002 |
| DE | 10337800 A1 | 3/2005 |

* cited by examiner

*Primary Examiner*—Aditya Bhat
(74) *Attorney, Agent, or Firm*—Hovey Williams LLP

(57) ABSTRACT

In a method for determining the gas volume flow in gas recirculation at a filling station, by means of a thermal throughflow sensor which is installed in the gas recirculation system of a gasoline pump, measurement values are detected, which represent the mass flow of the gas recirculated during refuelling operations from the respective tank of the motor vehicle to be refuelled into a storage tank of the filling station. Furthermore, information on the composition of the recirculated gas is detected, for example by means of a vapor-pressure curve or a thermal-conductivity measurement cell. The mass flow is determined from the measurement values obtained by the thermal throughflow sensor and the information on the composition of the recirculated gas, calibration data being used. This mass flow is converted into a gas volume flow characteristic of the region of the gasoline pump valves of the gasoline pump. The method is suitable for monitoring the gas recirculation system of the gasoline pump with high accuracy.

20 Claims, 1 Drawing Sheet

Figure 1:
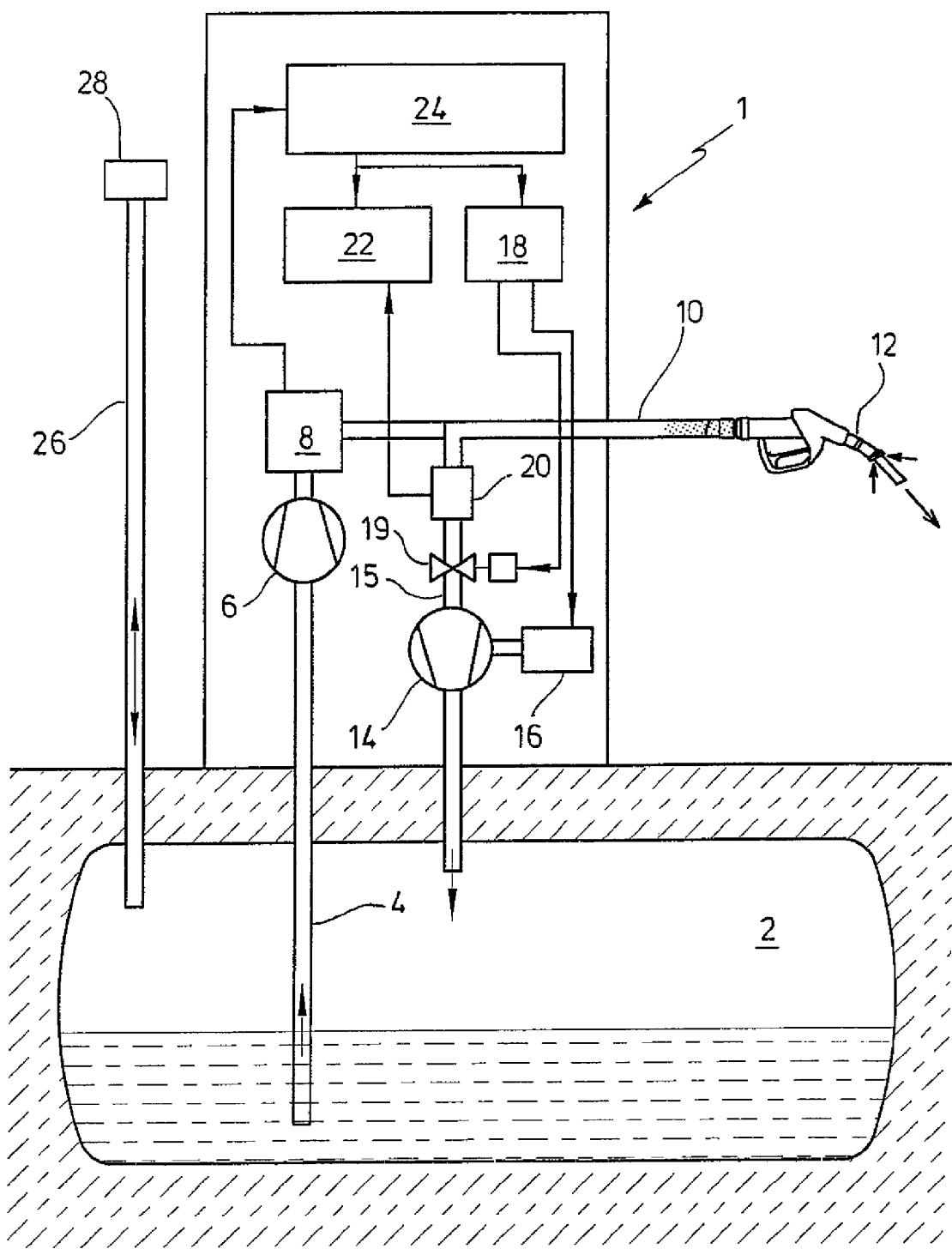

METHOD FOR DETERMINING THE GAS VOLUME FLOW IN GAS RECIRCULATION AT A FILLING STATION

RELATED APPLICATION

This Application claims priority of German Application Serial No. DE 10 2007 006 836.2, filed Feb. 12, 2007, which is hereby incorporated in its entirety by reference herein.

BACKGROUND

1. Field

The invention relates to a method for determining the gas volume flow in gas recirculation at a filling station and to a device for carrying out this method.

2. Discussion of Prior Art

When carburettor fuels are transferred from tank to tank at a filling station, hydrocarbons evaporate, specifically, for example, in a mass which corresponds approximately to 1 per thousand of the liquid mass. Previously, these hydrocarbon vapours were discharged as loss into the atmosphere. Since the benzenes contained in the hydrocarbon gas are harmful to health and the hydrocarbons act as greenhouse gases, emissions of this kind have to be reduced. This was stipulated in principle for all European countries in the Directive 94/63/EC. In most European countries, this directive was implemented in national regulations. There are also comparable regulations in other countries, for example in the USA.

The reduction of emissions is brought about by means of a recirculation of the hydrocarbon gases during the respective tank transfer operation. When a tanker vehicle is filled at the refinery and when a storage tank (underground tank) is filled at a filling station, an additional gas recirculation hose (gas displacement line) is connected. This is designated by "Stage I gas recirculation".

Gas recirculation during the filling of a motor vehicle at a filling station is called "Stage II gas recirculation". Since in this case the petrol pump valve does not come to bear, gas-tight, against the filler neck of the motor vehicle to be filled, the hydrocarbon gases are sucked in by means of a pump at the inlet of the petrol pump valve (active gas recirculation). The volume of the recirculated gas mixture at the suction-intake point should be equal to the liquid volume introduced into the tank of the motor vehicle, so that hydrocarbon gases escape into the atmosphere as little as possible. There should also not be too much which is sucked away, since a greater gas volume would otherwise be recirculated into the storage tank than liquid volume which has been extracted, which would lead to a pressure rise in the storage tank. Emissions would consequently arise at the ventilation mast of the storage tank, which likewise has to be avoided.

Active gas recirculation is implemented predominantly as an autonomous system, that is to say independently of a monitoring device which checks the gas recirculation rate. The gas recirculation control electronics for a petrol pump are connected to an output of the petrol-pump computer which delivers a pulse rate which is proportional to the instantaneous flow of the fuel, that is to say to the rate of conveyance of the liquid fuel which, during a refuelling operation is pumped into the tank of the motor vehicle to be refuelled, this being a liquid volume flow. By means of a balancing curve based on calibration data, the gas recirculation control electronics either calculate a control signal for a proportional valve or else generate a control signal which influences the rotational speed of the electric motor of a gas-conveying pump. In both instances, the gas throughflow (that is to say the gas volume flow) is set as a function of the fuel throughflow (that is to say, of the fuel volume flow), such that the recirculation rate (defined as the gas throughflow/fuel throughflow) is approximately 100%.

The balancing of gas recirculation, that is to say the determination of the calibration data mentioned, takes place, as a rule, by means of an auxiliary set-up. In this case, a volume-flow meter (for example, a positive-displacement gas meter) is connected, gas-tight, to the suction intake port of a petrol pump valve. A control signal for the rate of conveyance of gas recirculation is then generated and the associated gas throughflow is measured. This is carried out in a sequence for the overall throughflow range. The calibration data thus obtained (assignment of the control signals to the respective gas throughflow) are stored in a table in a non-volatile memory in the gas recirculation control electronics. After the removal of the auxiliary set-up, the gas recirculation system works, during normal tank-filling operation, with the balancing table generated according to this method.

Gas recirculation systems of the type described are monitored for their correct functioning by means of automatic monitoring systems. In this case, a gas throughflow sensor inserted into the gas recirculation line is connected to evaluation electronics of the gas recirculation monitoring. Furthermore, the said fuel volume flow pulses serving for activating the gas recirculation control electronics are applied to the evaluation electronics of the gas recirculation monitoring. This determines the recirculation rate from these and from the measured gas throughflow.

A gas recirculation system is known from U.S. Pat. No. 6,170,539 B1, in which the gas flow is measured and used for regulating the gas recirculation.

For an exact monitoring of the gas recirculation, it is necessary to know the gas volume flow in the region of the petrol pump valve, since, when a motor vehicle is being refuelled, exactly as much gas volume is to be sucked away from the tank of the vehicle per unit time as fuel volume is introduced. The gas sucked away is routed inside the petrol pump hose provided with a coaxial line and is then transported further within the petrol pump in a specific line. The gas-conveying pump is located there, which ensures a pressure difference in order to cause the gas throughflow. The gas then flows further on to the storage tanks of the filling station. The gas throughflow sensor may be installed, for example, upstream of the said proportional valve, but also, for example, downstream of the gas-conveying pump (this is particularly when only one gas throughflow sensor is provided in a petrol pump having a plurality of filling outlets).

Various heat exchange processes take place in the line routing described. For example, the fuel flows at the temperature of the storage tank (underground tank) of approximately 15° C. to the petrol pump valve, so that the gas which flows back inside the petrol pump hose and essentially has the temperature of the motor vehicle tank is heated in winter and cooled in summer. The gas volume flow changes as a result. Furthermore, considerable dynamic pressure drops occur in the lines and likewise influence the gas volume flow. In this case, there may even be adiabatic processes, this, in turn, influencing the gas temperature. All of this has the effect that the gas volume flow at the location of the gas throughflow sensor does not coincide with the gas volume flow actually to be determined in the region of the petrol pump valves. The influence of these diverse effects on the gas volume flow cannot be detected particularly accurately and therefore a measurement of the gas volume flow inside the petrol pump leads to considerable uncertainties.

SUMMARY

The object of the invention is to determine the gas volume flow in gas recirculation at a filling station with high accuracy, so that a reliable monitoring of the gas recirculation system at a filling station can be achieved.

This object is achieved by means of a method for determining the gas volume flow in gas recirculation at a filling station, having the features of Claim 1, and by means of a device for carrying out this method, having the features of Claim 11. Advantageous refinements of the invention may be gathered from the subclaims.

In the method according to the invention, measurement values are detected which represent the mass flow of the gas recirculated during refuelling operations from the respective tank of the motor vehicle to be refuelled into a storage tank of the filling station. This purpose is served by a thermal throughflow sensor which is installed in the gas recirculation system of a petrol pump. Furthermore, information on the composition of the recirculated gas is detected. By means of the measurement values obtained by the thermal throughflow sensor and the information on the composition of the recirculated gas, the mass flow is determined, using calibration data. The mass flow is converted into a gas volume flow characteristic of the region of the petrol pump valves of the petrol pump.

The invention is based on the recognition that a direct measurement of the mass flow of the recirculated gas is considerably more reliable than the measurement of the gas volume flow at a point well away from the petrol pump valve, and on recognizing how the mass flow can be determined exactly. For reasons of continuity, in gas recirculation, the mass flow of recirculated gas, that is to say the mass of gas pumped away per unit time through the gas recirculation line, remains constant and does not experience such changes as those of the gas volume flow.

The mass flow is detected, in principle, with the aid of a thermal throughflow sensor. A thermal throughflow sensor is known, for example, from DE 199 13 968 A1. The measurement principle is based on the cooling of a heating element by a fluid flow. The greater the throughflow is, the more heat is transferred away from the heating element, that is to say the more the temperature of the heating element falls (if the heating power is constant) or the higher the required heating power becomes (if the heating element is to be maintained at a constant temperature). The heat is transported away from the heating element via the quantity, that is to say the mass, of the gas or fluid flowing past. A thermal throughflow sensor therefore fundamentally reacts to the mass flow.

However, the heat discharge from the heating element not only depends on the mass flow but also on the composition of the flowing gas. For this reason, in the method according to the invention, the composition of the recirculated gas is detected, in order to determine the mass flow by means of the measurement values obtained by the thermal throughflow sensor and the information on the composition of the recirculated gas. The measurement values obtained directly by means of the thermal throughflow sensor are, for example, the measured temperature difference between the heating element and the ambient temperature or the measured heating power, in order to obtain a predetermined constant temperature difference, see, for example, DE 199 13 968 A1. Information on the composition of the recirculated gas is, for example, in the form of a thermal conductivity (for example, in turn expressed by a temperature or a heating power) or a temperature. In order to place these measurement values in relation to one another, calibration data are used which are stored, for example, in the form of a table in control electronics. It is not necessary to express the respective measurement values or data in conventional units, since predefined machine-readable formats fulfill the same purpose and can be handled more easily in practice.

As has already been mentioned, to detect information on the composition of the recirculated gas, the thermal conductivity of the recirculated gas can be measured. This purpose is served by a thermal-conductivity measurement cell, as described in DE 199 13 968 A1. A thermal-conductivity measurement cell of this type functions, in principle, in the same way as a thermal throughflow sensor, but the heat is not discharged from the heating element contained in the measurement cell by a medium flowing past, but, instead, as a result of the thermal conduction of the gas contained in the measurement cell and which is essentially at rest. The gas conveyed in gas recirculation on petrol pumps is a mixture of hydrocarbons and of air, the hydrocarbon component essentially being determined by the easily volatile butanes and pentanes contained in the carburettor fuel. Since butane gas and pentane gas do not exhibit any major differences in thermal conductivity, the air fraction in the recirculated gas can be detected very accurately with the aid of a thermal conductivity measurement cell, this being fully sufficient for the above-explained determination of the mass flow.

Another or additional possibility of detecting information on the composition of the recirculated gas is to measure a temperature characteristic of the temperature of the tank of a motor vehicle to be refuelled, preferably the external ambient temperature, and to determine the hydrocarbon fraction of the recirculated gas via the vapour pressure of the fuel used during refuelling. In this case, the hydrocarbon fraction of the recirculated gas may be determined as the hydrocarbon partial pressure, read off for the characteristic temperature from the vapour-pressure curve, standardized to the ambient pressure, preferably with the external air pressure determined by measurement being used as the ambient pressure. How this may be carried out in detail is described, for example, in DE 100 31 813 A1. The principle is based on the fact that, in the gas mixture of easily volatile hydrocarbons and air which is located above the liquid fuel in the tank of a motor vehicle to be refuelled, the partial pressure of the hydrocarbons is given by their vapour pressure, which, with a known composition of the fuel and therefore with a known vapour-pressure curve of the fuel, depends essentially only on the temperature. In practice, it is sufficient to distinguish between the vapour-pressure curves for "summer fuel" (fewer easily volatile constituents) and "winter fuel" (more easily volatile constituents).

The disclosure of the said publications DE 199 13 968 A1 and DE 100 31 813 A1 and also of the parallel U.S. Pat. Nos. 6,536,273 and 6,629,455 is hereby incorporated by reference into the present application.

According to the invention, the mass flow obtained in the way explained is converted into a gas volume flow characteristic of the region of the petrol pump valves of the petrol pump. In the conversion of the mass flow into a gas volume flow characteristic of the region of the petrol pump valves of the petrol pump, conversion may take place, using measurement values for the temperature and/or the pressure which are characteristic of the region of the petrol pump valves. In this case, the external ambient temperature can be used as a measurement value for the temperature and/or the external air pressure can be used as a measurement value for the pressure. During conversion, the ideal gas equation or a real gas equation may be employed.

This will be illustrated by the example of the ideal gas equation:

The state equation for an ideal gas of n mol at a pressure p in a volume V and at an absolute temperature T is $$pV = nRT$$

R is the gas constant. What is obtained from this by time derivation is $$p(dV/dt) = (dn/dt)RT,$$

this describing the gas volume flow (dV/dt). If the subscript Z is introduced for the surroundings of a petrol pump valve and the subscript S is introduced for the gas throughflow sensor, then $$pZ(dV/dt)Z = (dn/dt)Z\, R\, TZ$$

applies at the inlet of the petrol pump valve, and $$pS(dV/dt)S = (dn/dt)S\, R\, Ts$$

applies in the throughflow sensor.

On account of continuity in the stationary state $(dn/dt)Z = (dn/dt)S$, and $$(dV/dt)Z = R(TZ/pZ)(dn/dt)S. \quad (1)$$

is obtained for the gas volume flow at the petrol pump valve. (dn/dt)S corresponds to the mass flow in the throughflow sensor. To be precise, there will also have to be multiplication by the (average) molecular weight, in order to obtain the mass flow from (dn/dt)S. However, the (average) molecular weight, in principle, is known or can be estimated from the information on the composition of the recirculated gas, and therefore the molecular weight is already automatically taken into account by the use of calibration data, especially since the use of conventional units is not important here.

It can be seen from (1), that conversion to the gas volume flow at the petrol pump valve with the aid of the temperature TZ at the petrol pump valve and the pressure pZ (which coincides with the external air pressure when the motor vehicle tank is ventilated) can easily be carried out, particularly when calibration has taken place for a specific temperature TZ and a specific pressure pZ.

Vapours from hydrocarbons, such as butanes and pentanes, behave at ambient temperature more like real gases than ideal gases if they are not too highly diluted with air. Higher accuracy is therefore achieved when a real gas equation is employed instead of the ideal gas equation. However, the relation between dV/dt and dn/dt is linear in this case, too.

It is particularly advantageous if the gas volume flow which is determined according to the invention and is characteristic of the region of the petrol pump valves of a petrol pump is used for monitoring the gas recirculation system of the petrol pump. The basic principle of such monitoring was explained in the introduction. A further example of the monitoring of a gas recirculation system is found in DE 103 37 800 A1 (corresponding to US 2005/0045243 A1).

The gas volume flow determined according to the invention and characteristic of the region of the petrol pump valves may be used as a reference in an automatic calibration of the gas recirculation system of the petrol pump. In this case, the measurement values for the fuel volume flow, which are obtained by a fuel throughflow meter are placed in relation to control data for the gas recirculation, in order to achieve identity between the fuel volume flow and the gas volume flow.

This possibility exists because of the high accuracy of the method according to the invention. The conventional balancing operation described above, which takes place with the aid of an additional volume-flow meter to be connected externally and additional electronics (which, as a rule, are in the form of a hand-operated appliance), can therefore be replaced by a method which can be carried out by an automatic monitoring device for gas recirculation itself if this is set up for carrying out the method according to the invention. The balancing operation is in this case controlled by the electronics of the monitoring device. For calibration (balancing), gas recirculation is set in steps to various gas throughflows by activation by means of control signals. The associated gas volume flow is in each case determined with high accuracy by the method according to the invention and used as a reference. A value table (look-up table) consequently can be built up which indicates the assignment between the activation of gas recirculation (that is to say, for example, of a proportional valve or of the motor of a gas-conveying pump, as explained above) and the gas volume flow brought about thereby. This value table can be transmitted to the gas recirculation control electronics, in order thereby to carry out normal tank-filling operation. For this purpose, for example, the fuel volume flow corresponding to a given frequency of fuel counting pulses (output by a fuel throughflow meter) is equated to the gas volume flow to be recirculated, and the corresponding activation signal for gas recirculation is obtained from the value table.

So that the balancing operation described can be carried out by means of an existing monitoring device of a gas recirculation system, as a rule, apart from the ability to be able to carry out the method according to the invention for determining the gas volume flow, only one additional data connection between the evaluation electronics of the gas recirculation monitoring and the gas recirculation control electronics and also an addition to the operating software are required.

The method according to the invention for determining the gas volume flow can be carried out even when the petrol pump has a plurality of filling outlets, each filling outlet being assigned at least one specific fuel throughflow meter and the filling outlets being assigned a common thermal throughflow sensor which is arranged downstream of a convergence of the gas flows of the filling outlets. In this case, the sum of the gas volume flows of the individual filling outlets, as determined from the measurement values from the thermal throughflow sensor and from the information on the composition of the recirculated gas, is utilized as the gas volume flow characteristic of the region of the petrol pump valves of the petrol pump. This is readily possible, since the thermal throughflow sensor reacting to the mass flow is insensitive to pressure fluctuations in the gas recirculation system, such as occur during simultaneous tank-filling operations at a plurality of filling outlets. The pressure in the gas recirculation line also rises sharply when a filling of the storage tank takes place or when, in the event of a fault, a gas displacement valve arranged on the ventilation mast of the storage tank does not work correctly. Furthermore, a thermal throughflow sensor has high dynamics, so that higher gas volume flows, at the same time as refuelling on both sides of a petrol pump, can be determined without difficulty. The composition of the recirculated gas changes only insignificantly from motor vehicle to motor vehicle, because it depends essentially on the outside temperature and on the type of fuel (carburettor fuel for summer operation or winter operation), as explained above. The information on the composition of the recirculated gas therefore does not have to be detected individually for each filling outlet of the petrol pump. Even if only a single thermal throughflow sensor is present, which detects an overall gas volume flow in simultaneous refuelling operations, the individual filling outlets of the petrol pump can be assigned individual gas volume flows, as described in DE 10 2006 050 634 A1.

The method according to the invention, by means of which the gas volume flow in gas recirculation at a filling station can be determined with high accuracy, is carried out, in an advantageous refinement, with the aid of the monitoring device of the gas recirculation system of a petrol pump. If a thermal throughflow sensor is already present, an additional outlay in terms of apparatus is low, as already explained in connection with the automatic calibration of the gas recirculation system. As a rule, only an expansion of the software and changes to the data lines are required. The method according to the invention is therefore not only accurate, but also cost-effective.

Other aspects and advantages of the present invention will be apparent from the following detailed description of the preferred embodiments and the accompanying drawing FIGURE.

BRIEF DESCRIPTION OF THE DRAWING FIGURE

The invention is explained in more detail below with reference to an exemplary embodiment. In the drawing, FIG. 1 shows a diagrammatic view of a petrol pump, by means of which the method according to the invention can be carried out.

The drawing FIGURE does not limit the present invention to the specific embodiments disclosed and described herein. The drawing is not necessarily to scale, emphasis instead being placed upon clearly illustrating the principles of the preferred embodiment.

DETAILED DESCRIPTION OF THE PREFERRED EMBODIMENT

FIG. 1 illustrates diagrammatically a petrol pump 1 at a filling station, together with the most important parts, including the components of a gas recirculation system and its monitoring, which are arranged in it or are assigned to the petrol pump 1.

When the petrol pump 1 is in operation, fuel passes out of an underground storage tank 2 via a fuel line 4 and, conveyed by a fuel pump 6, through a fuel throughflow meter 8 serving to measure the fuel volume flow, and a petrol pump hose 10 to a petrol pump valve 12, from which the fuel is introduced into the tank of a motor vehicle, as indicated by large arrows. At the same time, the fuel vapours (gas, which, as a rule, is a mixture of hydrocarbons and air), which stand above the liquid fuel in the tank of the motor vehicle, are sucked away, this being indicated by the two small arrows at the petrol pump valve 12. This gas is sucked in by a gas pump 14 via a separate line routed within the petrol pump hose 10 and passes through a gas line 15 back into the storage tank 2. The gas pump 14 is driven by a drive motor 16.

In order to control the gas throughflow (gas volume flow), activation electronics 18 are provided. In the exemplary embodiment, an output signal from the activation electronics 18 acts on the drive motor 16 of the gas pump 14 in order to control its rotational speed. Alternatively to this (or even additionally), a proportional valve 19 may be provided, having a servomotor which is acted upon by the activation electronics 18 in order to control the gas volume flow.

In the gas recirculation system explained, the gas volume flow is adapted to the fuel volume flow. For this purpose, the signals (counting pulses) of the fuel throughflow meter 8 are fed to a control and monitoring device, in order to activate the activation electronics 18 such that the volume conveyance rate (volume flow) of the gas pump 14 coincides as far as possible with that of the fuel pump 6. In the exemplary embodiment this takes place via a value table determined by calibration, as explained above.

So that the monitoring system can react to faults in gas conveyance, the volume conveyance rate of the gas pump 14 is monitored. A thermal throughflow sensor 20 serves for determining the gas volume flow. The thermal throughflow sensor 20 may, in principle, be set up, as described in DE 199 13 968 A1 (corresponding to U.S. Pat. No. 6,536,273). The thermal throughflow sensor 20 delivers measurement values, which represent the mass flow of the recirculated gas, to a monitoring unit 22. The fact that a thermal throughflow sensor reacts to the mass flow has already been explained.

Furthermore, the monitoring unit 22 receives information on the composition of the recirculated gas. In the exemplary embodiment, this information is detected with the aid of a thermal-conductivity measurement cell which, with the thermal throughflow sensor 20, forms a structural unit and is therefore not depicted separately in FIG. 1. Such a structural unit is described in detail in DE 199 13 968 A1. Alternatively to this, the information on the composition of the recirculated gas may also be obtained by means of the vapour-pressure curve of the fuel and a temperature, as already explained. The information on the composition of the recirculated gas is used, together with the measurement values of the thermal throughflow sensor 20, in order to determine the mass flow. This takes place with the aid of calibration data, as described further below. In the exemplary embodiment, the steps required for this purpose are carried out in the monitoring unit 22.

FIG. 1 shows, furthermore, a petrol-pump computer 24, such as is installed, as standard, in the petrol pump 1. The petrol-pump computer 24 receives the fuel counting pulses, required by the activation electronics 18, from the fuel throughflow meter 8 and transfers them to the activation electronics 18 and the monitoring unit 22, as indicated by the arrows in FIG. 1.

As described in detail further above, the gas volume flow, such as is sucked into the petrol pump hose 10 at the petrol pump valve 12, has to be used for as exact a monitoring as possible of the gas recirculation system of the petrol pump 1. This gas volume flow is determined with the aid of the mass flow by means of the thermal throughflow sensor 20, for which purpose the measurement values of the thermal throughflow sensor 20 and information on the composition of the recirculated gas are utilized. In this case, calibration data are employed.

The calibration data may, for example, be obtained in the following way. In this example, a thermal-conductivity measurement cell serves for detecting information on the composition of the recirculated gas.

First, the thermal-conductivity measurement cell is calibrated. For this purpose, a gas volume flow with a specific hydrocarbon concentration (hydrocarbon fraction, that is to say a specific predetermined ratio of hydrocarbon and air) is led into the thermal-conductivity measurement cell, and, with the gas virtually at rest, by means of the power supplied to a heating element, or a measured temperature rise of the heating element, the heat discharged from the heating element through the gas is detected. Since the thermal conductivity depends on the temperature, preferably the temperature of the gas is also measured, if possible in or on the thermal-conductivity measurement cell. This is carried out, for the application temperature range, in the case of a plurality of temperatures and in the case of various hydrocarbon concentrations of a gas representative of the application.

What are thus obtained as measurement values are a heating power or a temperature rise as a measure of the thermal conductivity of a gas with a predetermined concentration, the temperature serving as an additional parameter. For a predetermined temperature, therefore, conversely, the hydrocarbon concentration in the gas can be read off from the measurement value. In order to allow rapid data acquisition and not to occupy too much memory storage space, mathematical functions with parameters are expediently adapted to the measurement values (for example, in the form of a spline interpolation). The parameters thus obtained are stored in a nonvolatile memory of the monitoring unit 22 or else in assigned electronics relating to the thermal throughflow sensor 20. Parameter matching is at the same time an averaging, for example, via copy dispersions, and substantially higher accuracy is achieved. During subsequent measurement operation, a measure of the gas concentration, that is to say the concentration of the hydrocarbons, is determined by means of these parameters and the instantaneous values of thermal conduction (expressed by the heating power or the temperature change in the thermal-conductivity measurement cell) and the temperature in or on the thermal-conductivity measurement cell.

In a second step to calibrate the thermal throughflow sensor 20, a gas flow with a predetermined hydrocarbon concentration is conducted through the thermal throughflow sensor 20, specifically with different gas volume flows which are measured independently by means of additional apparatus. The direct measurement values of the thermal throughflow sensor 20 are, again, a heating power or a temperature change. For each value of the hydrocarbon concentration, therefore, a measurement curve is obtained, which illustrates, for example, the dependence of the heating power of the heating element of the thermal throughflow sensor 20 as a function of the independently determined gas volume flow. From the family of curves for a number of representative hydrocarbon concentrations, the suitable measurement curve can be selected via the information, determined with the aid of the thermal-conductivity measurement cell, on the composition of the gas (that is to say, the hydrocarbon concentration).

In order to convert the mass flow, determined by means of the calibration data thus obtained, into the gas volume flow at the petrol pump valve 12, conversion to the pressure and, if appropriate, the temperature in the vicinity of the petrol pump valve 12 is also required, as described further above by the example of the ideal gas equation. For this purpose, the pressure may be determined, outside the potentially explosive region, by means of a cost-effective pressure sensor, for example, in the monitoring unit 22, which in the exemplary embodiment is located outside the potentially explosive region.

How an automatic calibration of the gas recirculation system of the petrol pump 1 can be carried out has already been described further above. A data connection required for this purpose between the monitoring unit 22 and the activation electronics 18 is not depicted in FIG. 1.

FIG. 1 shows, furthermore, a ventilation mast 26, for aerating and de-aerating the storage tank 2, the said ventilation mast being provided at its upper end with a gas displacement valve 28.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A method for determining the gas volume flow in gas recirculation at a filling station, comprising the steps of:
   detecting measurement values which represent the mass flow of the gas recirculated during refueling operations from the respective tank of the motor vehicle to be refueled into a storage tank of the filling station, by means of a thermal throughflow sensor which is installed in the gas recirculation system of a petrol pump;
   determining the composition of the recirculated gas;
   determining the mass flow by means of the measurement values obtained by the thermal throughflow sensor and the composition of the recirculated gas, using calibration data; and
   converting the mass flow into a gas volume flow characteristic of the region of the petrol pump valves of the petrol pump.

2. The method according to claim 1,
   in the step of determining the composition of the recirculated gas, measuring the thermal conductivity of the recirculated gas.

3. The method according to claim 2,
   in the step of determining the composition of the recirculated gas, measuring a temperature characteristic of the temperature of the tank of a motor vehicle to be refueled, and determining the hydrocarbon fraction of the recirculated gas via the vapour pressure of the fuel used during refueling.

4. The method according to claim 2,
   in the step of converting the mass flow into the gas volume flow characteristic of the region of the petrol pump valves of the petrol pump, conversion takes place, using measurement values selected from the group consisting of temperature, pressure, and combination thereof, which are characteristic of the region of the petrol pump valves.

5. The method according to claim 1,
   in the step of determining the composition of the recirculated gas, measuring a temperature characteristic of the temperature of the tank of a motor vehicle to be refueled, and determining the hydrocarbon fraction of the recirculated gas via the vapour pressure of the fuel used during refueling.

6. The method according to claim 5,
   said hydrocarbon fraction of the recirculated gas being determined as the hydrocarbon partial pressure, read off for the characteristic temperature from the vapour-pressure curve, standardized to the ambient pressure.

7. The method according to claim 6,
   said external air pressure being determined by measurement and being used as the ambient pressure.

8. The method according to claim 6,
   in the step of converting the mass flow into the gas volume flow characteristic of the region of the petrol pump valves of the petrol pump, conversion takes place, using measurement values selected from the group consisting of temperature, pressure, and combination thereof, which are characteristic of the region of the petrol pump valves.

9. The method according to claim 5,
said step of measuring a temperature characteristic being performed by measuring the external ambient temperature.

10. The method according to claim 5,
in the step of converting the mass flow into the gas volume flow characteristic of the region of the petrol pump valves of the petrol pump, conversion takes place, using measurement values selected from the group consisting of temperature, pressure, and combination thereof, which are characteristic of the region of the petrol pump valves.

11. The method according to claim 1,
in the step of converting the mass flow into the gas volume flow characteristic of the region of the petrol pump valves of the petrol pump, conversion takes place, using measurement values selected from the group consisting of temperature, pressure, and combination thereof, which are characteristic of the region of the petrol pump valves.

12. The method according to claim 11,
said converting step including the step of using an ideal gas equation.

13. The method according to claim 11,
said converting step including the step of using a real gas equation.

14. The method according to claim 11,
said external ambient temperature being used as the measurement value for the temperature.

15. The method according to claim 14,
said external air pressure being used as the measurement value for the pressure.

16. method according to claim 11,
said external air pressure being used as the measurement value for the pressure.

17. The method according to claim 1; and
using the gas volume flow characteristic of the region of the petrol pump valves for monitoring the gas recirculation system of the petrol pump.

18. The method according to claim 1; and
using the gas volume flow characteristic of the region of the petrol pump valves as a reference in an automatic calibration of the gas recirculation system of the petrol pump, the measurement values for the fuel volume flow, which are obtained by a fuel throughflow meter, being placed in relation to control data for the gas recirculation, in order to achieve identity between the fuel volume flow and the gas volume flow.

19. The method according to claim 1,
said petrol pump having a plurality of filling outlets, each filling outlet being assigned at least one specific fuel throughflow meter and the filling outlets being assigned a common thermal throughflow sensor which is arranged downstream of a convergence of the gas flows of the filling outlets, the gas volume flow characteristic of the region of the petrol pump valves of the petrol pump being the sum of the gas volume flows of the individual filling outlets.

20. The method according to claim 1, further comprising implementing the method using a device comprising:
a monitoring device which is designed to utilize measurement values, which are detected by means of the thermal throughflow sensor installed in the gas recirculation system of the petrol pump, and which represent the mass flow of the gas recirculated during refueling operations from the respective tank of the motor vehicle to be refueled into the storage tank of the filling station, and the composition of the recirculated gas in order to determine the mass flow, using calibration data, and to convert the mass flow into the gas volume flow characteristic of the region of the petrol pump valves of the petrol pump.

* * * * *